United States Patent [19]
Wildhaber

[11] 3,812,760
[45] May 28, 1974

[54] GEAR MAKING

[75] Inventor: Ernest Wildhaber, Rochester, N.Y.

[73] Assignee: Bird Island, Inc., Boston, Mass.

[22] Filed: Apr. 9, 1973

[21] Appl. No.: 348,889

[52] U.S. Cl............................................ 90/3, 90/9.6
[51] Int. Cl............................................. B23f 5/20
[58] Field of Search................................... 90/3, 9.6

[56] References Cited
UNITED STATES PATENTS
1,097,222   5/1914   Grannis................................ 90/3

Primary Examiner—Francis S. Husar

[57] ABSTRACT

Gear making apparatus of the type in which a rotary cutter has linear cutting edges, a relative feed motion is provided between the cutter and a continuously indexing workpiece to approximate the profile generating motion of an imaginary rack conjugate to the profiles to be generated, and the cutting edges lie in a longitudinally concave surface of revolution about the cutter axis and provide crowned gear teeth, the direction of the cutter axis being altered to bring the profile generating cutting edges closer to, or into, the plane of the ideal rack tooth surface as the edges pass through a plane halfway across the face width of the workpiece.

4 Claims, 5 Drawing Figures

PATENTED MAY 28 1974  3,812,760

GEAR MAKING

BACKGROUND OF THE INVENTION

1. Field of the Invention

This invention relates to gear making apparatus of the type in which a rotary cutter has linear cutting edges, a relative feed motion is provided between the cutter and a continuously indexing workpiece to approximate the profile generating motion of an imaginary rack conjugate to the profiles to be generated, and the cutting edges lie in a longitudinally concave surface of revolution about the cutter axis and provide crowned gear teeth.

2. Description of the Prior Art

One such apparatus is described in U.S. Pat. No. 3,595,130: cutter and workpiece both rotate as the workpiece is fed linearly along the cutter axis, and a differential rotation proportional to the feed rate is superimposed upon the cutter rotation to generate crowned gear teeth. Each cutting edge lies along an element of a wide-angled concave cone, and as it moves through a toothspace it sweeps, relative to the rotating workpiece, an imaginary surface approximating a rack tooth surface tilted at the helix angle (taken at the generating circle of the gear being made) relative to the workpiece axis. However, whereas the ideal rack tooth surface would be planar for perfect generation, the imaginary surface actually swept is twisted, by virtue of the facts that the cutting edge (because it rotates instead of sweeping along a linear path) is tilted out of the plane of the ideal rack tooth surface, and different points on the cutting edge (at respectively different radii about the cutter axis) have different components of velocity parallel to the workpiece axis. As a result of the imperfect approximation of the ideal rack tooth surface, errors are introduced into the generated profile and its pitch line (the intersection of the profile with a pitch cylinder, ideally a helix) even when the cutting edges lie in a plane perpendicular to the cutter axis. When the cutting edges lie along the elements of a wide-angled concave cone to provide crowning (or lie in some other longitudinally concave surface of revolution, e.g., as has been found useful when providing front rake of the cutting edges in addition to crowning), these errors are amplified.

SUMMARY OF THE INVENTION

The invention minimizes profile and pitch line error in crowned teeth. In preferred embodiments the error amplification attributable to conical arrangement of cutting edges is eliminated.

In general the invention features altering the direction of the cutter axis to bring the profile generating cutting edges closer to, or into, the plane of the ideal rack tooth surface as the edges pass through a plane halfway across the face width of the workpiece. Considering as A that angle by which a cutting edge would be tilted out of this rack tooth surface at midface of the workpiece were the relative feed motion exactly along the cutter axis, the invention features a relative feed motion between cutter and workpiece in a direction along, or at an angle less than A to, a line making the angle A with the cutter axis. In preferred embodiments a second cutter is provided for generating gear tooth profiles on the other side of the teeth, the cutters having axes at an angle to each other equal to 2A; and the workpiece and the cutter have basic rates of movement about their respective axes in the absence of the feed motion, and means are provided for controlling the movement of the workpiece and the cutter so that one of the basic rates of movement is increased or decreased, upon the occurrence of the feed motion, by a differential rate of movement dependent upon the feed rate, so that for each desired tooth profile the cutting edges will make a series of cuts on the workpiece respectively tangent to the desired profile along a succession of lines, the basic rates having a ratio dependent upon the ratio of the number of the cutting edges to the number of teeth in the gear so that each cutting edge will make a cut tangent to a desired profile as the latter passes across the path of movement of the respective cutting edge and so that between successive cuts tangent to any one desired profile there will intervene a complete revolution of the workpiece.

DESCRIPTION OF THE PREFERRED EMBODIMENT

Figure 1:
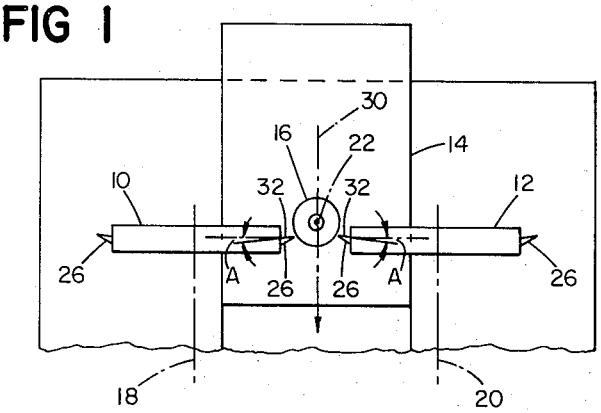
FIG. 1 is a fragmentary diagrammatic view in the plane of the cutter axes of apparatus disclosed in U.S. Pat. No. 3,595,130.
Figure 2:
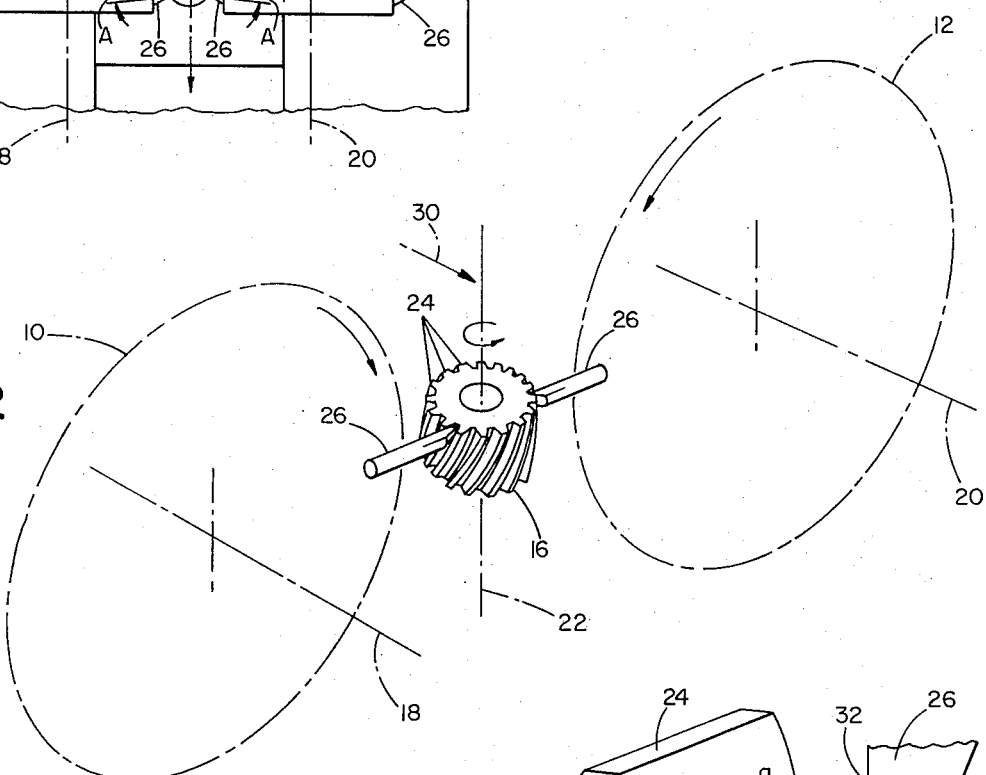
FIG. 2 is a diagrammatic perspective view of the tool-workpiece relationship in the apparatus of FIG. 1.
Figure 4:
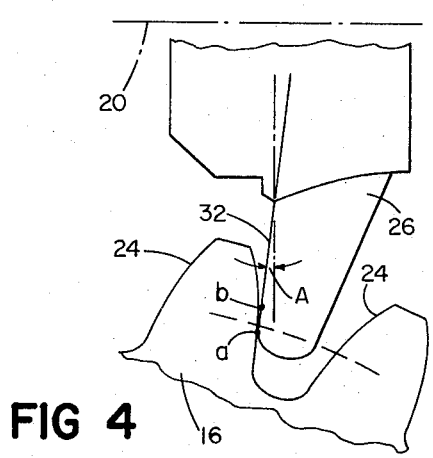
FIG. 4 is a fragmentary diagrammatic plan view of a tool and a workpiece.

Referring to the drawings, FIG. 1 shows two cutters 10 and 12, and work slide 14 carrying workpiece 16, all arranged as described in detail in U.S. Pat. No. 3,595,130. The cutters and workpiece respectively rotate (FIG. 2) about their axes 18, 20, and 22 at basic indexing rates such that the ratio of cutter to workpiece rates equals the ratio of the desired number of gear teeth 24 being made to the number of tools 26 per cutter. The common plane of axes 18 and 20 intersects axis 22 halfway across the workpiece face width. As slide 14 and workpiece 16 are fed toward the cutters, along a line 30 parallel to the cutter axes, a differential rotation is superimposed upon the indexing rotation of the cutters, the differential rate being a function of the feed rate to thereby determine the shape of the tooth profiles generated. The two cutters respectively generate profiles on opposite sides of the teeth. Tools 26 have linear profile-generating edges 32 which lie along elements of wide-angled (e.g., 170°-179°) concave cones, so that each edge 32 is out of perpendicularity with its respective cutter axis by a small angle A (FIGS. 1, 4).

Figure 3:
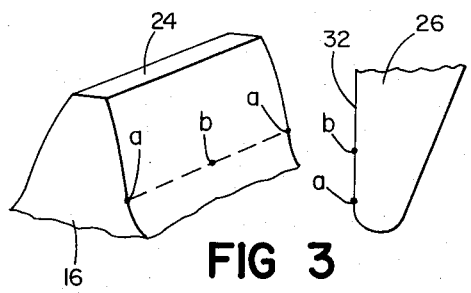
FIG. 3 is a fragmentary diagram of a tool and a gear tooth showing the movement of the point of contact along the cutting edge.

As each tool 26 moves through a toothspace the combination of the tool movement and the workpiece rotation causes edge 32 to sweep, relative to the workpiece, an imaginary surface approximating a rack tooth surface tilted at a helix angle (of teeth 24) relative to workpiece axis 22. As shown in FIG. 3, edge 32 contacts the desired profile at a point which shifts along the edge since the tool moves through an arc, from point *a* at the top of the workpiece, to *b* when the tool is halfway across the workpiece face width with edge 32 perpendicular to axis 22, back to *a* at the bottom of the workpiece. Since the radius of the profile-contacting point of edge 32 about its axis of rotation is constantly changing, so does the peripheral velocity of the cutting edge change at that point of contact. In addition, the angle made by edge 32 with axis 22 changes as the tool moves through the toothspace. As a result, edge 32 sweeps an imaginary surface that is twisted relative to the ideal rack tooth surface being approximated, introducing the errors in profile and pitch line mentioned above. In effect, the twist can be considered as introducing changes in the pressure angle of the imaginary generating rack as it moves across the workpiece face width.

Radial cutting edges intersecting the cutter axis at right angles describe pitch lines without curvature at mid-face on the generating rack. The teeth can be crowned lengthwise with straight cutting edges that are elements of a wide-angled and slightly concave cone. However, with edges 32 thus out of perpendicularity with their respective cutter axes, the workpiece feed along line 30 is correspondingly non-perpendicular to edges 32, causing the generating pressure angle of the imaginary rack to be non-zero even at midface of the workpiece. It has been discovered that, while the variation of the rack pressure angle across the workpiece face width is approximately the same whether or not edges 32 are conically arranged for crowning, the conical arrangement, by making the rack pressure angle non-zero at midface, greatly amplifies the profile and pitch line errors attributable to that pressure angle variation. This is because the pressure angle produced on the gear depends directly on the produced base circle. The base-circle radius equals the radius of the rolling circle used in generation multiplied by the cosine of the transverse pressure angle. The cosine stays very close to one at small angles. If the rack pressure angle is zero at mid-face, the described twist of the rack-tooth surface has almost no effect on the base circle radius, and therefore on the gear pressure angle. And the minute effect is equal and in the same direction on both sides of mid-face. Neither is true when the pressure angle at mid-face equals angle A.

Figure 5:
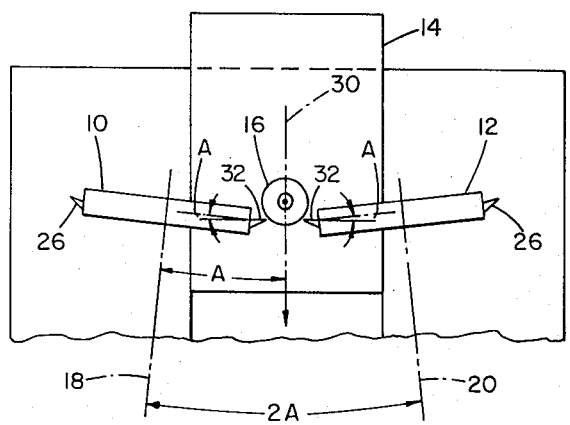
FIG. 5 is a view similar to FIG. 1 with the cutter axes positioned according to the present invention.

FIG. 5 illustrates an arrangement for eliminating the error amplification just described. The cutter axes 18 and 20 are shifted by angle A to make equal to zero the rack pressure angle at midface. Thus, with an angle of 2A between axes 18 and 20, each edge 32 will be perpendicular to feed line 30 as that edge passes through the common plane of the cutter axes.

The advantages of the invention will be partially obtained even when the cutter axes are shifted by an angle not exactly A, so long as the feed motion is in a direction at an angle less than A to a line making an angle A with the cutter axis. In other words, the invention teaches reduction of midface pressure angle sufficiently to give useful corresponding reduction of the described error amplification.

If desired we may introduce positive or negative front rake in the cutting process by offsetting edges 32 so that they no longer intersect the cutter axis. Considering such a cutter in the absence of any conical inclination of the cutting edges for crowning, if rake is introduced by a simple tilting of edges 32 in a plane perpendicular to the cutter axis it affects the rack pressure angle at midface and changes the profile generated. It is thus preferable to introduce the rake by tilting edges 32 in such a way that the rack pressure angle at midface is unaffected; this requires that the edges be inclined slightly to said plane in addition to being offset from the cutter axis.

When cutting at mid-face the cutting edge should always lie in the plane tooth side of a rack of zero pressure angle, that is in a plane perpendicular to the rack pitch-plane that rolls without sliding on the gear during generation. When the cutting edge is tilted forward or backward from the perpendicular to this pitch plane, to provide rake, its inclination to a plane perpendicular to the cutter axis is affected. This inclination change is algebraically added to the angle A that provides tooth crowning and defines the direction of the cutter axes.

Other embodiments are within the following claims.

1. In gear making apparatus of the type in which a cutter has cutting edges mounted for rotation about a cutter axis; a relative feed motion is provided between said cutter and a continuously indexing workpiece to approximate the profile generating motion of an imaginary rack conjugate to the profiles to be generated; and said cutting edges lie in a longitudinally concave surface of revolution about said cutter axis and provide crowned gear teeth; whereby said cutting edges, when viewed in a plane halfway across the face width of said workpiece, would be tilted out of the tooth surface of said imaginary rack by an angle A were said feed motion in a direction along said cutter axis; that improvement wherein said cutter and said workpiece are mounted so that said relative feed motion is in a direction along, or at an angle less than A to, a line making said angle A with said cutter axis.

2. The improvement of claim 1 wherein said workpiece axis is perpendicular to said cutter axis and to said line.

3. The improvement of claim 1 further comprising a second cutter constructed and disposed in a manner analogous to the first said cutter for generating gear tooth profiles on the correspondingly opposite sides of said teeth from said profiles generated by the first said cutter, said cutters having axes at an angle to each other equal to 2A.

4. The improvement of claim 1 wherein
said workpiece and said cutter have basic rates of movement about their respective axes in the absence of said feed motion, and
one of said basic rates of movement is increased or decreased, upon the occurrence of said feed motion, by a differential rate of movement dependent upon the rate of said feed motion, so that for each desired tooth profile said cutting edges will make a series of cuts on said workpiece respectively tangent to said desired profile along a succession of lines,
said basic rates having a ratio dependent upon the ratio of the number of said cutting edges to the number of teeth in said gear so that each said cutting edge will make a cut tangent to a desired profile as the latter passes across the path of movement of the respective cutting edge and so that between successive cuts tangent to any one desired profile there will intervene a complete revolution of said workpiece.

* * * * *